(12) United States Patent
Cao et al.

(10) Patent No.: US 7,769,999 B2
(45) Date of Patent: Aug. 3, 2010

(54) METHOD AND SYSTEM FOR REMOTE PASSWORD BASED AUTHENTICATION USING SMART CARDS FOR ACCESSING A COMMUNICATIONS NETWORK

(75) Inventors: Zhenfu Cao, Guangdong Province (CN); Xiaolei Dong, Guangdong Province (CN); Zhenchuan Chai, Guangdong Province (CN); Zhibin Zheng, Guangdong Province (CN); Jiwei Wei, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 791 days.

(21) Appl. No.: 11/649,488

(22) Filed: Jan. 4, 2007

(65) Prior Publication Data

US 2008/0016333 A1 Jan. 17, 2008

(30) Foreign Application Priority Data

Jul. 13, 2006 (CN) .................... 2006 1 0098850

(51) Int. Cl.
*H04L 29/06* (2006.01)
(52) U.S. Cl. .................. 713/155; 713/159; 713/169; 713/185; 726/9; 726/20; 380/281
(58) Field of Classification Search .................. None
See application file for complete search history.

(56) References Cited

U.S. PATENT DOCUMENTS 6,226,383 B1 * 5/2001 Jablon .................... 380/30

OTHER PUBLICATIONS

Jablon, Extended Password Key Exchange Protocols Immune to Dictionary Attacks, Jun. 18-20, 1997, Proceedings of the Sixth Workshops on Enabling Technologies: Infrastructure for Collaborative Enterprises (WET-ICE '97), IEEE Computer Society, Cambridge, MA, p. 248-255.*

Liao et al., A password authentication scheme over insecure networks, available online Nov. 10, 2005 on www.sciencedirect.com, Journal of Computer and System Sciences 72.*

Hwang et al., A Simple Remote User Authentication Scheme, 2002, Mathematical and Computer Modelling 36 (2002) 103-107.*

Qiu, Hui-min et al. "A New Mutual User Authentication Scheme Using Smart Card," Application Research of Computers vol. 12.2005:103-105.

Office Action issued in Corresponding Chinese Patent Application No. 2006100988505; issued Feb. 19, 2009.

* cited by examiner

*Primary Examiner*—Kieu Oanh Bui
*Assistant Examiner*—Thomas Lauzon
(74) *Attorney, Agent, or Firm*—Brinks Hofer Gilson & Lione

(57) ABSTRACT

The present invention discloses a method and system for remote password based authentication using smart cards for accessing a communications network. The disclosed method does not require a remote authentication sever to maintain a table of passwords for all users. The disclosed method and system also support mutual authentication. It not only prevents the illegal use of system resources by an impersonator, the user can also authenticate the identity of the remote authentication server.

14 Claims, 7 Drawing Sheets

600

METHOD AND SYSTEM FOR REMOTE PASSWORD BASED AUTHENTICATION USING SMART CARDS FOR ACCESSING A COMMUNICATIONS NETWORK

CROSS REFERENCE

The present application claims the benefit of Chinese Patent Application Serial 200610098850.5, which was filed on Jul. 13, 2006.

BACKGROUND

With the advancement in telecommunications technologies and communications networks, a user can access various resources remotely via a communications network. For example, a user who works in a remote branch office can access the documents in the central office or access the services provided by the service provider. Security and accessibility are two of the key requirements for the design of a communications network.

Authentication is the process of attempting to verify the digital identity of a user who wants to access protected resources on the network. The goal of the authentication process is two-fold: to allow a legitimate user to access available resources and to prevent an intruder from impersonating a legitimate user. In other words, the authentication process protects a user's information from being obtained by another person and denies unauthorized use of network resources. The most commonly used authentication method is to use a password to secure the resources. It has been shown that the traditional authentication method that is based solely on a user ID and a fixed password is inadequate for applications that require a high level of security protection.

A portable smart card with embedded computation capabilities has been widely adopted in two factor authentication methods. An authentication process involving a smart card and a password has been recognized as a more secure authentication method.

An authentication system may issue each user a smart card with embedded information pertinent to the user. When the user wants to access the system resources from a remote location, the authentication process is required. The user enters his or her user ID and password after inserting the smart card into a smart card reader coupled to a remote terminal (e.g., a USB device that integrates the smart card and a smart card reader into a remote terminal.) The smart card generates a login request message using the user ID and the password. If the remote authentication server confirms the identity of the user, it grants the access to the system resources.

A password based remote authentication method was first proposed in 1981. In this method, a remote authentication server maintains a table of passwords for all registered users. The remote authentication server verifies the identity of a user by comparing the password entered by the user with the one in the table. This method is simple but not scalable, and the system employing this method is an easy target for dictionary attacks. In addition, the cost of maintaining and protecting user passwords by an authentication server increases drastically with an increase in the number of users.

A new authentication method was proposed in 2000. In this method, a remote authentication server maintains a security key $x_s$. Based on the security key $x_s$ and the user ID, the authentication server creates a strong password, a 1024-bit security key, for a user. The method only requires an authentication server to maintain a security key not a table of passwords. However, it does not allow users to change their passwords. This restriction limits the practicability of the method.

In 1999, a different remote password authentication method based on time-stamps was proposed. The method does not need to maintain a table of passwords and it allows users to select their own passwords. A few more time-stamp based authentication methods were proposed in 2002 and 2003.

The commonalities of the time-stamp based authentication methods are as follows: First, a user can select his/her own password. Second, a remote authentication server does not need to maintain a table of passwords. Third, the authentication process is non-interactive, i.e., a user sends a one-way message to the remote authentication server, which validates the identity of the user.

The shortcoming of the time-stamp based authentication methods results from the fact that users tend to choose short and easy-to-remember passwords, usually 6 to 10 digits alphanumerical characters. This type of password is very easy to break by a dictionary attack.

A dictionary attack can be either an online attack or an offline attack. In the case of an online attack, a hacker tries to be authenticated by a remote authentication server by exhausting all possible passwords. There are two ways to defend against an online dictionary attack. The first method is to delay responses. The authentication server delays sending a login response to the remote terminal to prevent the hacker from exhausting all possible passwords in a finite amount of time. The second method is to lock the user account after several failed attempts to be authenticated by the authentication server. In other words, the authentication server temporarily deactivates the user account, which prevents the hacker from getting the correct password by exhausting all possible passwords in a finite amount of time.

An offline dictionary attack is a stronger attack technique. The hacker first intercepts the login information of a user and illegally obtains the user information stored in the smart card. The hacker then tries to guess the user password by calculating user information and exhausting all possible passwords. Because an offline dictionary attack has no interaction with the remote authentication server, it is more effective.

Smart card based authentication methods are susceptible to offline dictionary attacks due to the following two reasons. First, users tend to select weak passwords that are easier to remember. Second, the portability of a smart card brings convenience to users but the card could be lost or stolen.

Theoretically, a smart card must be temper proof, but in reality, multiple types of probe attacks exit. The information stored in a smart card can be obtained illegally. In some cases, user information is simply stored in the smart card without any protection. The hacker can use a dictionary attack to obtain the user password and impersonate the user to have unauthorized access to the system resources.

In one of the time-stamp based authentication methods, the parameters maintained by the system include n, e, d, and g; n and g are public information while e is a public key and d is a private key. The integer n is the product of two large prime numbers p and q, i.e., n=pq while the integer g is a predetermined system parameter (a primitive element) in GF(q) and GF(p). The selection of a public key e and a private key d must satisfy the following condition: ed≡1 mod $\phi$(n).

In the registration phase, a user U submits his/her identity ID and password PW to an remote authentication server. Upon receiving a registration request from the user, the authentication server authenticates the identity ID of the user. If the identity of the user is confirmed, the authentication server generates a smart card identifier CID and calculates the security information S of the user according to the following equation: $S=ID^d$ mod n. The authentication server also generates a value h according to the following equation: $h=g^{PW \cdot d}$ mod n. The set of information (n, e, g, CID, S, and h) is written into the memory of the smart card and the card is issued to the user U.

In the login phase, the user U must be authenticated by a remote authentication server. The user inserts the smart card into the smart card reader coupled to the remoter terminal and enters the user identity ID and password PW. The smart card calculates two integers X and Y according to the following two equations: $X=g^{r \cdot PW}$ mod n and $Y=S \cdot h^{r \cdot f(CID, T)}$ mod n, where r is a random number; T is the current time at the login terminal and used as a time-stamp; f( . . . ) is a one-way function. The smart card sends a login request message, M=(ID, CID, X, Y, n, e, g, T), to the remote authentication server.

In the authentication phase, the remote authentication server receives the login request and tries to authenticate the user identity ID and time-stamp T. If both pieces of information are valid, the remote authentication server checks if $Y^e$ equals to $ID \cdot X^{f(CID, T)}$ mod n. If $Y^e$ and $ID \cdot X^{f(CID, T)}$ mod n are equal, the login request is accepted, or else it is denied.

This authentication method is vulnerable to dictionary attacks. If the hacker gets a hold of the user's smart card and retrieves the value $h=g^{PW \cdot d}$ mod n from the smart card, the hacker can exhaust all possible passwords and find a password PW*. If $g^{PW*}$ is equal to $h^e$ mod n, then PW* is the password of the user.

In another method, a remote authentication server only maintains a system security key x and a public hash function. In the registration phase, a user U submits his/her identity ID and password PW to the authentication server. Upon receiving the registration request from the user, the authentication server authenticates the identity ID of the user. If the identity of the user is confirmed, the authentication server generates a value R according to following equation: $R=h(ID \oplus x) \oplus PW$. The set of information (R and h) is written into the memory of the smart card and the card is issued to the user U.

In the login phase, the user U must be authenticated by the remote authentication server. The user inserts the smart card into the smart card reader coupled to a remoter terminal and enters the user identity ID and password PW. The smart card calculates two parameters k and C according to the following equations: $k=R \oplus PW$ and $C=h(c \oplus T)$, where T is the current time at the login terminal and used as a time-stamp. The smart card sends a login request message, M=(ID, T, C), to the remote authentication server.

In the authentication phase, the remote authentication server receives the login request and tries to authenticate the user identity ID and time-stamp T. If both pieces of information are valid, the remote authentication server checks if C equals to $h(h(ID \oplus x) \oplus T)$. If C and $h(h(ID \oplus x) \oplus T)$ are equal, the login request is accepted; otherwise, it is denied.

This authentication method is also vulnerable to dictionary attacks. If the hacker gets a hold of the user's smart card, retrieves the value R from the smart card, and intercepts the login information, M=(ID, T, C), the hacker can exhaust all possible passwords and find a password PW*. If C is equal to $h(R \oplus PW* \oplus T)$, then PW* is the password of the user.

As such, what is desired is a method and system to further improve the smart card based remote authentication system.

SUMMARY

The construction and method of operation of the invention, however, together with additional objects and advantages thereof, will be best understood from the following description of specific embodiments when read in connection with the accompanying drawings.

The present invention discloses a method and system for remote password based authentication using smart cards for accessing a communications network. According to one embodiment of the present invention, after generating a first encrypted user message encrypting a predetermined system parameter using a first hash function and an inverse function of a second hash function with a predetermined security key as an input for a first hash function and a user password as an input for the inverse function of a second hash function, the first encrypted user message is sent to be stored in a smart card used by a user. During the authentication process, an authentication server may receive a login request message containing a first value and a second value. The second value is generated based on a third hash function, the input of which includes a second encrypted user message, which is generated by using the user password as an input for the second hash function. The authentication process verifies a predetermined relationship between the second value and a third value, wherein the third value is generated using the third hash function having at least one input which is a function of the first value and the first hash function uses the security key as an input.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

Figure 1:
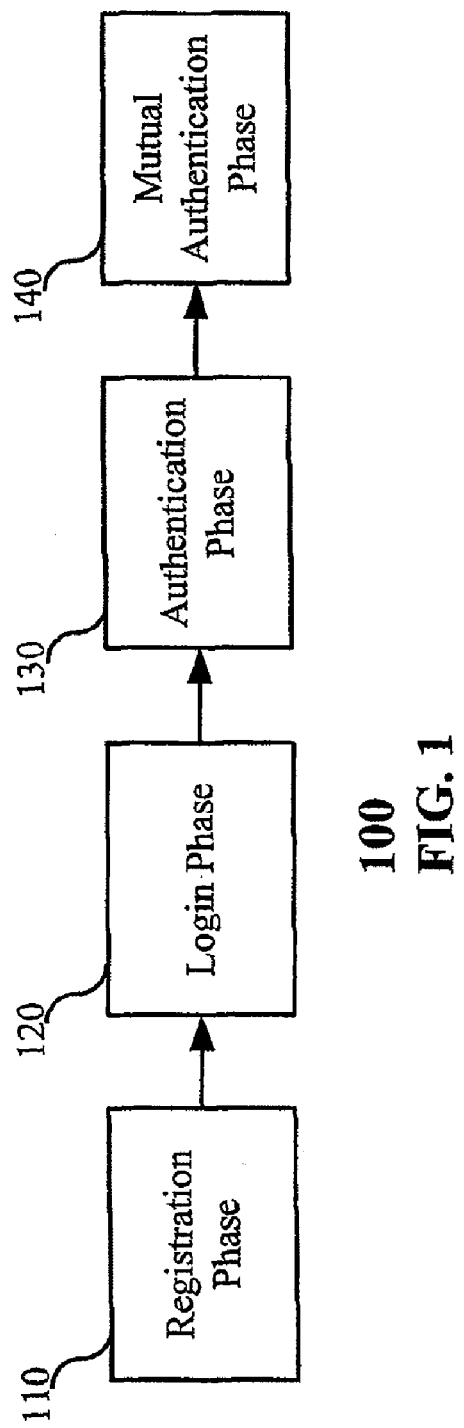
FIG. 1 is a flow diagram illustrating the four phases of an authentication process.

The authentication process disclosed in the present invention has four phases. FIG. 1 is a flow diagram 100 illustrating the four phases of an authentication process in the disclosed method. Phase 110 is a registration phase, followed by phase 120, a login phase. Phase 130 is an authentication phase while phase 140 is an optional authentication phase for mutual authentication.

In the registration phase 110, a user subscribes services from a remote communications network. The user submits personal identification information and a password to the communications network. Once the communications network confirms the identity of the user, it issues a smart card to the user.

In the login phase 120, to access the resources of the communications network from a remote terminal, the user inserts the smart card into a smart card reader and enters the user ID and the password at the remote terminal. The smart card generates a login request using the user ID and the password and sends a login request message to a remote authentication server.

In the authentication phase 130, the authentication sever verifies the identity of the user and completes the authentication process. In a preferred embodiment of the disclosed method, the authentication server interacts with the smart card to execute mutual authentication in the second authentication phase 140. The remote authentication server sends a response to the smart card. The smart card processes the response received from the authentication server and completes mutual authentication.

Figure 2:
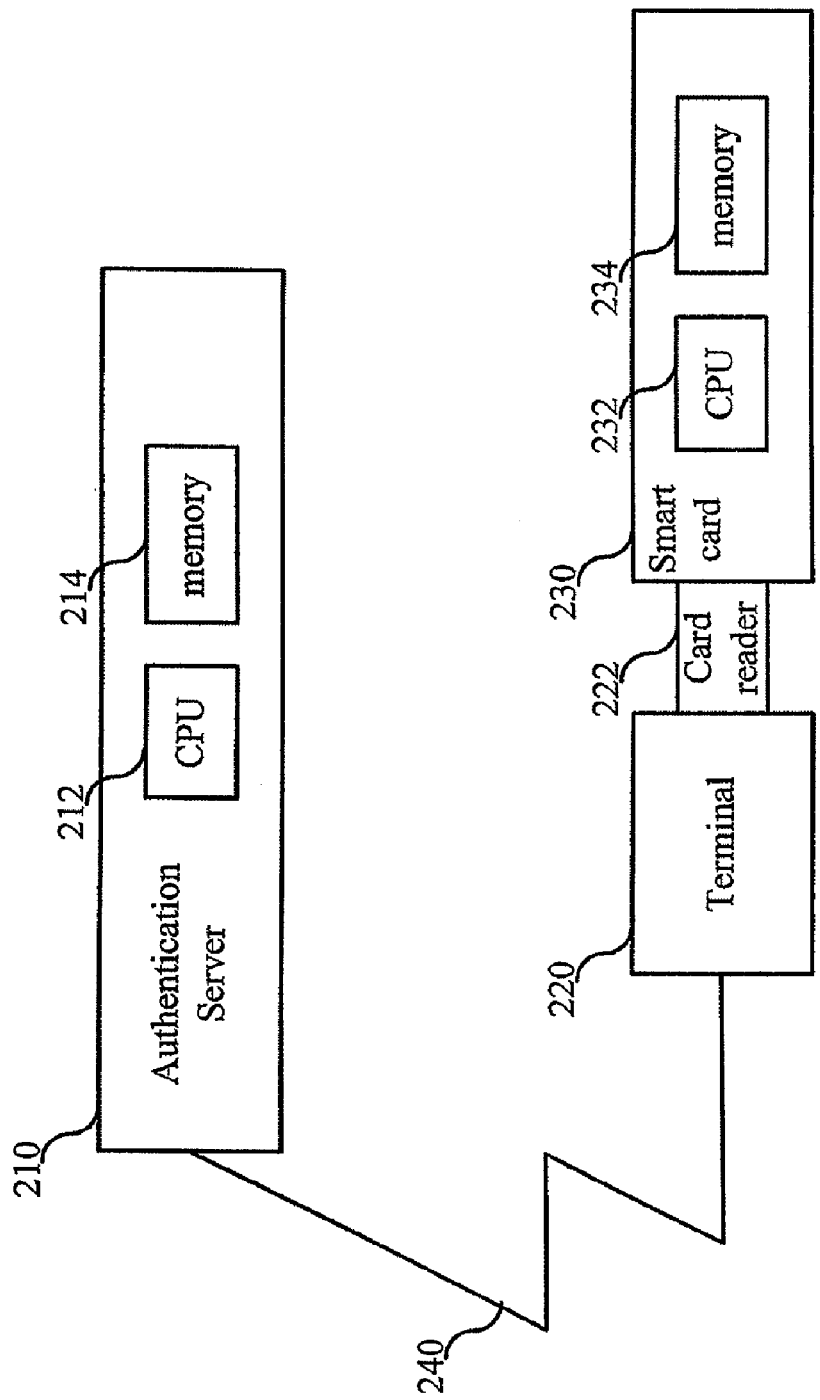
FIG. 2 is block diagram illustrating an authentication system.

FIG. 2 is a block diagram illustrating an authentication system. The system is comprised of an authentication server 210, a remote terminal 220 coupled to a smart card reader 222, a smart card 230, and a communications network 240. The authentication server 210 and the remote terminal 220 are connected through the communications network 240. Although it is not shown, it is understood that the communications network has various software and hardware resources available such as databases and servers for specific functions. The authentication server 210 maintains a system security key and at least three hash functions that are stored in a memory module 214. A CPU module 212 computes various parameters which are used in the authentication process, (e.g., the first encrypted user message as will be explained below).

A smart card 230, equipped with a CPU module 232 and a memory module 234 that stores encrypted user messages, is issued to a user. The user accesses the resources of the communications network by inserting the smart card 230 into the smart card reader 222 connected to the remote terminal 220 and entering the user identity information and a password. The CPU module 232 in the smart card computes selected parameters (e.g., a second encrypted message as will be explained below), which are used in the authentication process. The smart card 230 and the authentication server 210 then exchange authentication messages via the communications network 240 for completing the authentication process.

The detailed implementation of the disclosed method is further described in the following sections.

The authentication system employing the disclosed invention provides at least the following information: system parameters—p, g, and x, and hash functions—$h_1(\ldots)$, $h_2(\ldots)$ and $H(\ldots)$. The length of a prime number p may be greater than or equal to 1024 bits. A common practice of selecting p is to find another prime number q such that $p=2q+1$. The value of g is a primitive element of $GF(p)$.

Parameter x is the security key of the system, stored in the remote authentication server, and the length of x may be greater than or equal to 1024 bits. The three functions $h_1(\ldots)$, $h_2(\ldots)$ and $H(\ldots)$ are public hash functions, which may be either MD5 or SHA-1. The smart card uses some of the hash functions to compute the security key.

Figure 3:
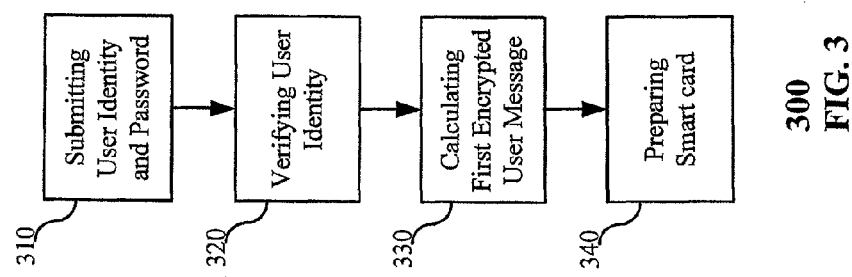
FIG. 3 is a flow diagram illustrating steps performed in a registration phase.

FIG. 3 is a flow diagram 300 illustrating the registration phase. In step 310, a user U registers to a server for the first time by submitting identification information ID and a password PW. In step 320, after receiving the registration request, the authentication server tries to verify the identity of the user based on the ID and PW. In step 330, if the identify of the user is verified, the authentication server uses the system security key x as the input for the hash function $h_1(\ldots)$ and uses the user password PW as the input for the inverse function of the hash function $h_2(\ldots)$ to calculate an encrypted user message according to the following equation: $g_{ID|PW}=g^{h_1(ID\|x)\cdot h_2^{-1}(PW)}$ mod p, where $\|$ represents a concatenation operation.

The security key x and a user ID can be combined in use using other algorithms. Using a combination of the system security key x and a user ID as the input for the hash function $h_1(\ldots)$ enhances the safety of the security key x as it is harder for the hacker to guess the system security key x.

In step 340, the authentication server writes the predetermined system parameters and the encrypted user message ($g_{ID|PW}$, g, p) into the smart card and issues the card to the user.

Figure 4:
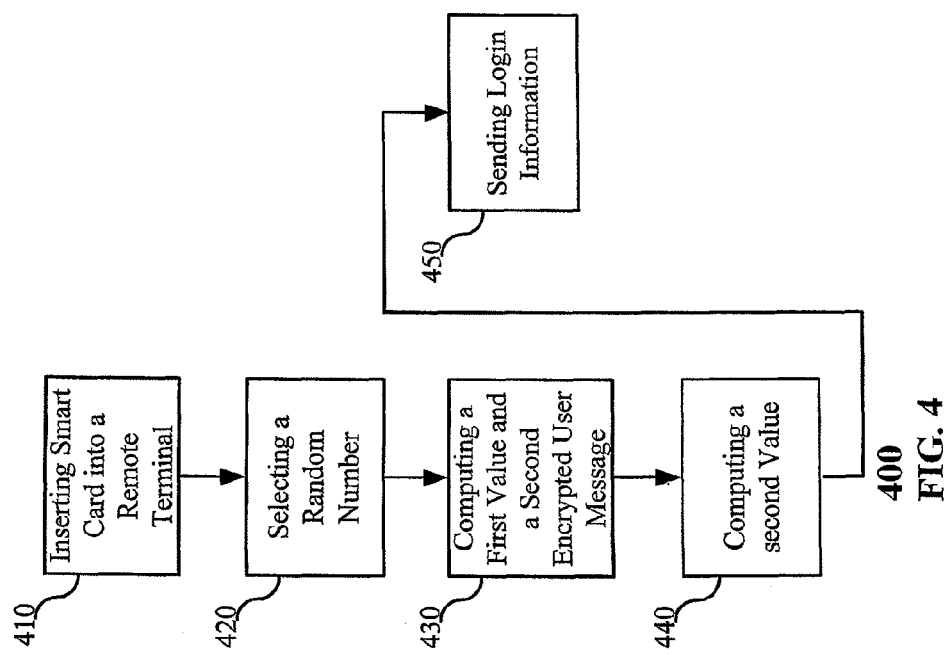
FIG. 4 is a flow diagram illustrating steps performed in a login phase.

FIG. 4 is a flow diagram 400 illustrating the login phase. In step 410, a user attempts to access the resources available on the communications network by inserting the smart card into a smart card reader coupled to a remote terminal and entering the user ID and, the password.

In step 420, a number r is randomly selected by the smart card from a set of integers $[1\ldots p-1]$, where $r\in[1\ldots p-1]$. The smart card uses the password as the input for the hash function $h_2(\ldots)$ and generates a number $\epsilon$ according to the following equation: $\epsilon=r\cdot h_2(PW)\mod(p-1)$, where PW is the password.

In step 430, a value $C_1$ is calculated according to the following equation: $C_1=g^r \mod p$ and another encrypted user message k is calculated according to the following equation: $k=g_{ID|PW}^{\epsilon}=g_{ID|PW}^{r\cdot h_2(PW)} \mod p$.

In step 440, the current time T is obtained from the login terminal and a value $C_2$ is calculated according to the following equation: $C_2=H(ID, T, k) \mod p$.

In step 450, login information, $M=(C_1, C_2, T, ID)$, is sent to the remote authentication server as part of a login request message.

It is preferred to include the user identification ID and/or timestamp T in the login request message. It is acceptable to calculate $C_2$ with only the parameters T and k. Because the calculation of $C_2$ includes a random number r, the safety of the value $C_2$ is further enhanced.

Figure 5:
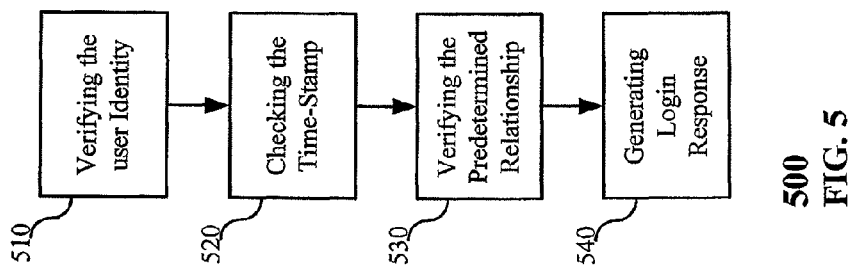
FIG. 5 is a flow diagram illustrating steps performed in an authentication phase.

FIG. 5 is a flow diagram 500 illustrating an authentication phase. In step 510, the authentication server receives the information M in the login request message at time T' from the user U. The authentication server tries to authenticate the validity of the user ID and the format of the request. It denies the login request if the information can not be confirmed.

In step 520, the authentication server determines whether the time difference between the transmitting time of the login request T and the receiving time of the login request T' is less than a predetermined threshold $\Delta T$, i.e., whether $T'-T\leq\Delta T$ is true. If $T'-T$ is greater than the threshold, the login request is denied.

In step 530, the authentication server uses the security key x concatenated with the user ID as the input for the hash functions $h_1(\ldots)$ to verify the information in the login request message. The authentication server verifies whether $H(ID, T, C_1^{h_1(ID\|x)})$ equals $C_2 \mod p$. If $H(ID, T, C_1^{h_1(ID\|x)})=C_2 \mod p$, the login request is authenticated and the user is granted access to the services. If the system is set for mutual authentication, which is an optional step, the process moves on to step 540, or else the authentication process is completed.

In step 540, the authentication server obtains the current time $T_{server}$, uses $T_{server}$, user ID and $C_1^{h_1(ID\|x)}$ as the input for the hash function H( . . . ), and generates a value θ, where θ=H($T_{server}$, ID, $C_1^{h_1(ID\|x)}$) and ∥ is the concatenation operator. The authentication server sends a response message, M'= (θ, ID, $T_{server}$) to the smart card.

Figure 6:
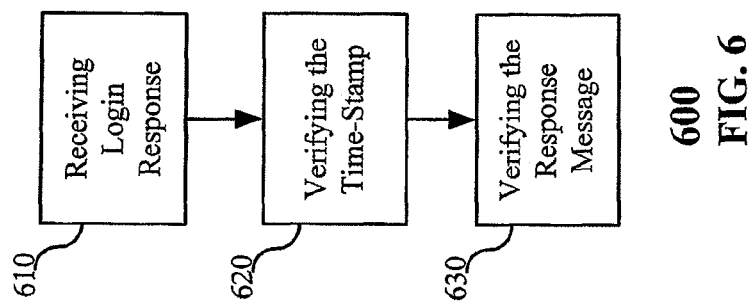
FIG. 6 is a flow diagram illustrating steps performed in a mutual authentication phase.

FIG. 6 is a flow diagram 600 illustrating a mutual authentication phase. In step 610, the smart card receives an authentication response message containing the information M'=(θ, ID, $T_{server}$).

In step 620, the smart card evaluates the validity of the user ID and time-stamp $T_{server}$. If both user ID and timestamp $T_{server}$ are valid, the smart card moves on to step 630, or else the smart card abandons the login request.

In step 630, the smart card checks if the following statement θ=H($T_{server}$, ID, k) is true. If it is true, the authentication process is successful and the user is granted the access to the system resources, or else the smart card disconnects itself from the authentication server or issues a new login request.

Figure 7:
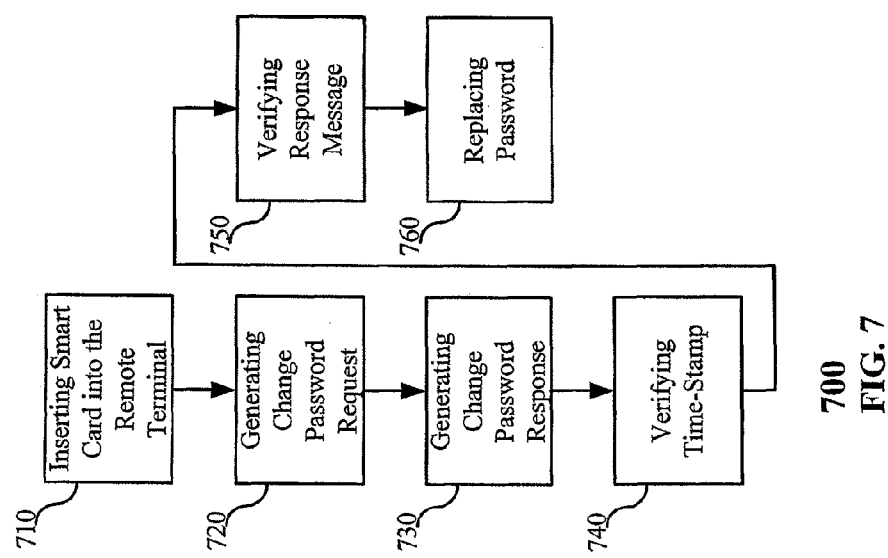
FIG. 7 is a diagram illustrating a procedure for changing user passwords.

The disclosed authentication process in the present invention allows a user to change his or her password arbitrarily without a need to re-register the new password through the registration phase. FIG. 7 is a diagram 700 illustrating a procedure for changing user passwords.

In step 710, the user inserts the smart card into the smart card reader connected to the remote terminal, enters the user ID, the current password PW and the new password PW*.

In step 720, the smart card generates login information M according to the following equation: M=($C_1$, $C_2$, T, ID, REQ), where $C_1=g^r$; $C_2$=H(ID, T, REQ, $g_{ID|PW}^{r \cdot h_2(PW)}$); r is a randomly selected number from [1 . . . p–1]; the login request type REQ indicates that a request to change password is made. The smart card sends the authentication server a login request message containing a password change request M.

In step 730, the authentication server processes the received login request message according to the login request type REQ and validates the correctness of the information M. If the information M is correct, the authentication server calculates the response information θ=H($T_{server}$, ID, REP, $C_1^{h_1(ID\|x)}$), where the login response type REP indicates that the information includes a response to change password request. The authentication server sends the response message that contains M'=(θ, $T_{server}$, ID, REP) back to the smart card. If the information M is incorrect, the authentication server generates a response message with information M'= (NULL, $T_{server}$, ID, REP) and sends the response message back to the smart card.

In step 740, the smart card first evaluates the validity of the user ID and time-stamp $T_{server}$. If both user ID and timestamp $T_{server}$ are valid, the smart card moves on to step 750, or else the smart card abandons the login request.

In step 750, the smart card checks if the following statement θ=H($T_{server}$, ID, REP, $g_{ID|PW}^{r \cdot h_2(PW)}$) is true. If it is true, the authentication process is successful and the smart card executes the next step to change the password.

In step 760, the smart card calculates $g_{ID|PW}^*$= $g_{ID|PW}^{h_2(PW) \cdot h_2(PW^*)^{-1}}$ mod p and overwrites the value $g_{ID|PW}$ with $g_{ID|PW}^*$.

The method disclosed in the present invention provides convenience and security. If a user loses a smart card or the secure information is stolen by a hacker, it is next to impossible for the hacker to retrieve the user's password with an off-line dictionary attack, impersonate the user, and login to the remote server.

The disclosed method does not require a remote authentication sever to maintain a table of passwords for all users. The remote authentication server at minimum maintains the 1024 bits security key, which is very easy to protect and easy to maintain. The disclosed method also supports mutual authentication. It not only prevents the illegal use of system resources by an impersonator, the user can also authenticate the identity of the remote authentication server. It is understood that because the smart card has the processing power, the authentication process described above can be reversed so that the smart can also authenticate the authentication server. In addition, the disclosed method provides a user friendly interface for changing user passwords.

The method disclosed in the present invention reduces the cost for manufacturing smart cards and thus increases the utilization of the smart card system. Because losing some security information does not necessarily result in security problems, the smart card itself does not need high level protection. A generic smart card with a nonvolatile storage and some computation functions is sufficient for a secure application. Only registration information needs to be written into the smart card when the smart card is issued to the user and the card can be reprogrammed for a different user.

Because the disclosed authentication process does not require a user to physically secure the smart card in order to protect the encrypted user message of the user, the disclosed method encourages a wider range of use of smart cards. The present method also provides a solution to a user terminal device that may not have dedicated secure storage space, such as a mobile phone. In a mobile phone, user information is stored in an unprotected storage, not smart cards. Even if a hacker illegally obtains the mobile phone and retrieves the user information, the disclosed authentication process still protects the system resources from being illegally accessed.

The above illustration provides many different embodiments or embodiments for implementing different features of the invention. Specific embodiments of components and processes are described to help clarify the invention. These are, of course, merely embodiments and are not intended to limit the invention from that described in the claims Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for remote password based authentication using smart cards for accessing a communications network, the method comprising:

generating, by an authentication server, a first encrypted user message $g_{ID|PW}$, by encrypting a predetermined system parameter, g, using a first hash function, h1( . . . ), and an inverse function of a second hash function, h2( . . . ), with a concatenation of a predetermined security key x and a user ID as input for the first hash function and a user password PW as an input for the inverse function of the second hash function according to $g_{ID|PW}=g^{h_1(ID\|x) \cdot h_2^{-1}(PW)}$ mod p;

sending, by the authentication server, the first encrypted user message and predetermined system parameters, g, p to be stored in a smart card used by the user, that enable the smart card to send a login request message when the user uses a remote terminal to login to the communications network by entering the user ID and the user password PW, wherein the login request message contains a first value, C1 and a second value, C2, the C1 being generated according to $C_1=g^r$ mod p, and C2 being generated according to $C_2$=H(ID, T, k) mod p, wherein H( . . . ) is a third hash function, inputs of which include a time-stamp T representing a current time of the terminal and a second encrypted user message, k, which is generated according to $k=g_{ID|PW}^{r \cdot h_2(PW)}$ mod p, where r is a random number;

receiving, by the authentication server, the login request message containing the first value and the second value; and verifying, by the authentication server, a predetermined relationship between the second value and a third value, wherein the third value is generated using the third hash function having at least one input based on a function of the first value and the first hash function which uses the security key as an input.

2. The method of claim 1, wherein the login request message further comprises the time-stamp T, the user ID, the verifying further comprising:

validating, by the authentication server, a user ID; and confirming, by the authentication server, that a time difference between a transmitting time and a receiving time of the login request message is less than a predetermined threshold.

3. The method of claim 2, wherein the verifying further comprises transmitting a login response message to the smart card, wherein the login response message includes a fourth value θ which is generated according to $\theta= H(T_{server}, ID, C_1^{h_1(ID\|x)})$ with a time-stamp Tserver, the user ID, and $C_1^{h_1(ID\|x)}$ as input for the third hash function, the time-stamp Tserver indicative of a current time when the authentication server transmits the login response message.

4. A method for changing user passwords from a remote terminal using smart cards for accessing a communications network, the method comprising:

connecting a smart card to a remote terminal, wherein the smart card stores a first encrypted user message, $g_{ID|PW}$, which is generated by encrypting a predetermined system parameter, g, using a first hash function, h1( . . . ), and an inverse function of a second hash function, h2( . . . ), with a concatenation of a predetermined security key x and a user ID as input for the first hash function and a first password PW as an input for the inverse function of the second hash function according to $g_{ID|PW}=g^{h_1(ID\|x) \cdot h_2^{-1}(PW)}$ mod p;

receiving, by the smart card, the user ID, the first password PW, and a second password PW* entered by a user at the remote terminal;

transmitting, by the smart card, a change password message containing a change request REQ, a first value C1, and a second value C2, wherein the second value is generated based on a third hash function, H( . . . ), the input of which includes a second encrypted user message, the second encrypted user message generated by using the first password PW as an input for the second hash function;

receiving, by the smart card, a response to change password message, wherein the response to change password message includes a third value θ generated by using the third hash function, wherein the third hash function having at least one input which is a function of the first value C1 and the first hash function utilizing the security key x as an input; and replacing, by the smart card, the first encrypted user message $g_{ID|PW}$ with a third encrypted user message $g^*_{ID|PW}$ by encrypting the first encrypted user message $g_{ID|PW}$ using the second hash function and an inverse function of the second hash function with the first password PW as an input for the second hash function and the second password PW* as an input for the inverse function of the second hash function according to $g^*_{ID|PW}= g_{ID|PW}^{h_2(PW) \cdot h_2(PW^*)^{-1}}$ mod p.

5. The method of claim 4, wherein the receiving a response to change password message further comprises:

validating a user ID; and confirming that a time difference between a transmitting time and a receiving time of the response to the change password message is less than a predetermined threshold.

6. The method of claim 4, wherein the first value, C1, is further generated according to $C_1=g^r$, and the second value, C2, is further generated according to $C_2=H(ID, T, REQ, g_{ID|PW}^{r \cdot h_2(PW)})$, wherein the time-stamp T represents a current time of the terminal, and r is the random number; and the third value, θ, is further generated according to $\theta=H(T_{server}, ID, REP, C_1^{h_1(ID\|x)})$ with a time-stamp Tserver, the user ID, the login response type REP, and the $C_1^{h_1(ID\|x)}$ as the input for the third hash function, the time-stamp Tserver representing a current time when transmitting the response.

7. The method of claim 6, further comprising:

verifying, by the smart card, whether the third value θ equals $H(T_{server}, ID, REP, g_{ID|PW}^{r \cdot h_2(PW)})$, and the replacing process is performed when $\theta=H(T_{server}, ID, REP, g_{ID|PW}^{r \cdot h_2(PW)})$.

8. A system for remote password based authentication using smart cards for accessing a communications network, the system comprising:

an authentication server for authenticating a user;

a remote terminal;

a smart card reader coupled to the remote terminal; and a smart card, wherein the authentication server is configured to generate a first encrypted user message, $g_{ID|PW}$, by encrypting a predetermined system parameter, g, using a first hash function, h1( . . . ), and an inverse function of a second hash function, h2( . . . ), with a concatenation of a predetermined security key x and a user ID as input for the first hash function and a user password PW as an input for the inverse function of the second hash function according to $g_{ID|PW}=g^{h_1(ID\|x) \cdot h_2^{-1}(PW)}$ mod p, and the smart card is configured to store the first encrypted user message and predetermined system parameters, g, p, and generate and transmit a login request message when the user uses the remote terminal to login the communications network by entering the user ID and the user password PW, wherein the login request message contains a first value, C1, and a second value, C2, with C1 being generated according to $C_1=g^r$ mod p, and with the C2 being generated according to $C_2=H(ID, T, k)$ mod p, wherein H( . . . ) is a third hash function, inputs of which include the user ID, a time-stamp T representing a current time of the terminal, and a second encrypted user message, k, which is generated according to $k=g_{ID|PW}^{r \cdot h_2(PW)}$ mod p, where r is the random number, and wherein the authentication server is further configured to receive the login request message containing the first value C1 and the second value C2 and to verify a predetermined relationship between the second value C2 and a third value, wherein the third value is generated using the third hash function having at least one input which comprises a function of the first value C1 and the first hash function which uses the security key x as an input.

9. The system of claim 8, wherein the authentication server is further configured to transmit a login response message to the smart card, wherein the login response message includes a fourth value θ which is generated according to θ=H($T_{server}$, ID, $C_1^{h_1(ID\|x)}$) with the user ID and a time-stamp Tserver representing a current time when the authentication server transmits the login response message, and $C_1^{h_1(ID\|x)}$ as the input for the third hash function.

10. A method for remote password based authentication using smart cards for accessing a communications network, the method comprising:

generating, by an authentication server, a first encrypted user message, $g_{ID|PW}$, by encrypting a predetermined system parameter, g, using a first hash function, h1( . . . ), and an inverse function of a second hash function, h2( . . . ), with a concatenation of a predetermined security key x and a user ID as input for the first hash function and a user password PW as an input for the inverse function of the second hash function according to $g_{ID|PW} = g^{h_1(ID\|x) \cdot h_2^{-1}(PW)}$ mod p;

sending, by the authentication server, the first encrypted user message and predetermined system parameters, g, p to be stored in a smart card used by the user that enable the smart card to send a login request message when the user uses a remote terminal to login to the communications network by entering the user ID and the user password PW, wherein the login request message contains a first value, C1, and a second value, C2, with the C1 being generated according to $C_1 = g^r$ mod p, and with C2 being generated according to $C_2 = H(ID, T, k)$ mod p, wherein H( . . . ) is a third hash function, inputs of which include the user ID, a time-stamp T representing a current time of the terminal, and a second encrypted user message, k, which is generated according to $k = g_{ID|PW}^{r \cdot h_2(PW)}$ mod p, where r is the random number;

receiving, by the authentication server, the login request message containing the time-stamp T, the user ID, the first value, C1, and the second value, C2; and verifying, by the authentication server, whether a third value, H(ID, T, $C_1^{h_1(ID\|x)}$) equals $C_2$ mod p, wherein the third value is generated using the third hash function with the user ID and the time-stamp T and $C_1^{h_1(ID\|x)}$ as input, wherein if H(ID, T, $C_1^{h_1(ID\|x)}$)=$C_2$ mod p, the login request message is authenticated and the user is granted.

11. The method of claim 10, wherein the login request message further comprises the time-stamp T and the user ID, and the verifying further comprises:

validating, by the authentication server, a user ID; and confirming, by the authentication server, that a time difference between a transmitting time T and a receiving time of the login request message is less than a predetermined threshold.

12. The method of claim 11, wherein the verifying further comprises transmitting a login response message to the smart card, wherein the login message includes a fourth value θ which is generated according to θ=H($T_{server}$, ID, $C_1^{h_1(ID\|x)}$) with a time-stamp Tserver, the user ID, and $C_1^{h_1(ID\|x)}$ as input for the third hash function, the time-stamp Tserver representing a current time when the authentication server transmits the login response message.

13. A system for remote password based authentication using smart cards for accessing a communications network, the system comprising:

an authentication server for authenticating a user;

a remote terminal;

a smart card reader coupled to the remote terminal; and a smart card, wherein the authentication server is configured to generate a first encrypted user message, $g_{ID|PW}$, by encrypting a predetermined system parameter, g, using a first hash function, h1( . . . ), and an inverse function of a second hash function, h2( . . . ), with a concatenation of a predetermined security key x and a user ID as input for the first hash function and a user password PW as an input for the inverse function of the second hash function h2( . . . ) according to $g_{ID|PW} = g^{h_1(ID\|x) \cdot h_2^{-1}(PW)}$ mod p, and wherein the smart card is configured to store the first encrypted user message, $g_{ID|PW}$, and predetermined system parameters, g, p and generate a login request message when the user uses the remote terminal to login the communications network by entering the user ID and the user password PW, wherein the login request message contains a first value, C1, and a second value, C2, with C1 being generated according to $C_1 = g^r$ mod p, and with C2 being generated according to $C_2 = H(ID, T, k)$ mod p, wherein H( . . . ) is a third hash function, inputs of which include the user ID, a time-stamp T representing a current time of the terminal, and a second encrypted user message, k, which is generated according to $k = g_{ID|PW}^{r \cdot h_2(PW)}$ mod p, where r is the random number, wherein the authentication server is further configured to receive the login request message containing the time-stamp T, the user ID, the first value and the second value and verify whether a third value H(ID, T, $C_1^{h_1(ID\|x)}$) equals $C_2$ mod p, wherein if H(ID, T, $C_1^{h_1(ID\|x)}$)=$C_2$ mod p, the login request message is authenticated and the user is granted.

14. The system of claim 13, wherein the authentication server is further configured to transmit a login response message to the smart card, wherein the login response message includes a fourth value θ which is generated according to θ=H($T_{server}$, ID, $C_1^{h_1(ID\|x)}$) with the user ID, a time-stamp Tserver, and $C_1^{h_1(ID\|x)}$ as the input for the third hash function, the time-stamp Tserver representing a current time when the authentication server transmits the login response message.

* * * * *